United States Patent
Schuette et al.

(10) Patent No.: US 8,116,327 B2
(45) Date of Patent: Feb. 14, 2012

(54) COMMUNICATIONS NETWORK AND MANAGEMENT ARBITRATOR

(75) Inventors: Michael A. Schuette, Wilmette, IL (US); S. David Silk, Barrington, IL (US); David A. Hume, Deer Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 774 days.

(21) Appl. No.: 11/830,506

(22) Filed: Jul. 30, 2007

(65) Prior Publication Data

US 2009/0034414 A1 Feb. 5, 2009

(51) Int. Cl.
*H04L 12/54* (2006.01)

(52) U.S. Cl. .................. 370/401; 370/230.1; 379/45

(58) Field of Classification Search ............... 370/230.1, 370/401; 379/45, 102.01; 340/286.01, 506; 709/227
See application file for complete search history.

(56) References Cited

U.S. PATENT DOCUMENTS

| | | |
|---|---|---|
| 6,670,909 B2 | 12/2003 | Kim |
| 7,010,097 B2 | 3/2006 | Zellner et al. |
| 7,110,919 B2 | 9/2006 | Brindac et al. |
| 2002/0007304 A1 | 1/2002 | Kasajima et al. |
| 2004/0202290 A1* | 10/2004 | Zellner et al. .................. 379/45 |
| 2004/0215778 A1 | 10/2004 | Hesse et al. |
| 2005/0125467 A1* | 6/2005 | Oosaki et al. .................. 707/204 |
| 2005/0200474 A1* | 9/2005 | Behnke .......................... 340/521 |
| 2005/0375525 | 12/2005 | Ahmed |
| 2006/0023270 A1 | 2/2006 | Valentinis |
| 2007/0174467 A1* | 7/2007 | Ballou et al. .................. 709/227 |

FOREIGN PATENT DOCUMENTS

| | | | |
|---|---|---|---|
| WO | 2004028090 A1 | 4/2004 | |
| WO | 2006044752 A2 | 4/2006 | |

* cited by examiner

*Primary Examiner* — John Pezzlo
*Assistant Examiner* — Matthew Campbell
(74) *Attorney, Agent, or Firm* — Simon B. Anolick; Terri Hughes Smith; Daniel R. Bestor

(57) ABSTRACT

A method, information processing system, and network that expands safety network coverage for first responder safety within a building environment. Activity of at least one independent network (106) is monitored. The independent network (106) includes at least a safety network. An emergency signal is received from the at least one independent network (106). Communication between at least the safety network (106) and a First responder network (110) is automatically bridged in response to receiving the emergency signal so as to manage data control and bandwidth allocation between the safety network and the first responder network. Other networks that may also be bridged with the first responder network so as to manage data control and bandwidth allocation among the various networks include IT networks and building automation networks in order to expand first responder network coverage.

21 Claims, 5 Drawing Sheets

COMMUNICATIONS NETWORK AND MANAGEMENT ARBITRATOR

FIELD OF THE INVENTION

The present invention generally relates to the field of network management, and more particularly relates to expanding safety network coverage for a first responder during an emergency situation.

BACKGROUND OF THE INVENTION

Office buildings, warehouses, and buildings used for many other purposes are beginning to incorporate various types of networks. For example, a building may comprise an Information Technology network ("IT") that provides typical computer network functionalities, telephony services, video services, and the like. Another type of network is a building automation network ("BAN"). A BAN is a network that manages and automates various systems of a building such as mechanical systems, electrical systems, and the like. For example a BAN network can comprise environmental systems (e.g., HVAC systems) and lighting systems that are managed by the BAN. An additional type of network is a safety network that manages the safety systems within a building. In-building safety networks generate large amounts of real-time information that is useful to first responders. For example, in-building safety networks can determine fire location, hazmat material location, and the like. Building automation networks allow for control of various subsystems such as elevators and ventilation for smoke control.

Access to this information and control of these subsystems are limited to information presented at on-site display panels and information relayed to incident commanders via a dispatch center. Also, buildings comprising an internal wireless IT network can experience interference between the IT network and the first responder wireless equipment as well as any of the building's wireless safety equipment. This interference can impair first responder operations. Furthermore, data generated by the safety network can be compromised during the emergency incident if not stored in a device that has a high chance of surviving the incident. This information may be needed to perform a post-incident analysis.

Therefore a need exists to overcome the problems with the prior art as discussed above.

SUMMARY OF THE INVENTION

Briefly, in accordance with the present invention, disclosed is a method, information processing system, and a network solution that expands safety network coverage for a first responder within a building environment. The method comprises monitoring activity of at least one independent network. The independent network includes at least a safety network. An emergency signal is received from the at least one independent network. Communications between at least the safety network and a first responder network is automatically bridged in response to receiving the emergency signal so as to manage data control and bandwidth allocation between the safety network and the first responder network. Other networks that may also be bridged with the first responder network so as to manage data control and bandwidth allocation among the various networks include IT networks and building automation networks in order to expand first responder network coverage.

In another embodiment, an information processing system for providing first responder safety within a building environment is disclosed. The information processing system includes a memory and a processor that is communicatively coupled to the memory. An incident monitor is adapted to receive an emergency signal from at least one independent network. A network manager is adapted to monitor activity of the at least one independent network. The independent network includes at least a safety network. The network manager automatically bridges, in response to receiving the emergency signal, communication between at least the safety network and a first responder network.

In yet another embodiment, a network for providing first responder safety within a building environment is disclosed. The network comprises at least one independent network comprising a safety network and a first responder network. At least one information processing system is communicatively coupled to the at least one independent network and the safety network. The information processing system includes a memory and a processor that is communicatively coupled to the memory. An incident monitor is adapted to receive an emergency signal from the at least one independent network. A network manager is adapted to monitor activity of the at least one independent network. The network manager automatically bridges, in response to receiving the emergency signal, communication between at least the safety network and the first responder network.

An advantage of the foregoing embodiments of the present invention is that critical information and resources across multiple networks can be provided to first responder personnel during times of an emergency. The present invention performs necessary bridging functions between various networks and first responder equipment during emergency situations. The present invention also manages bandwidth allocation between the various networks according to a current status of the building. Network data can be stored locally and off-site, thereby ensuring that valuable data is not compromised during an emergency, such as a fire.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Exemplary System

Figure 1:
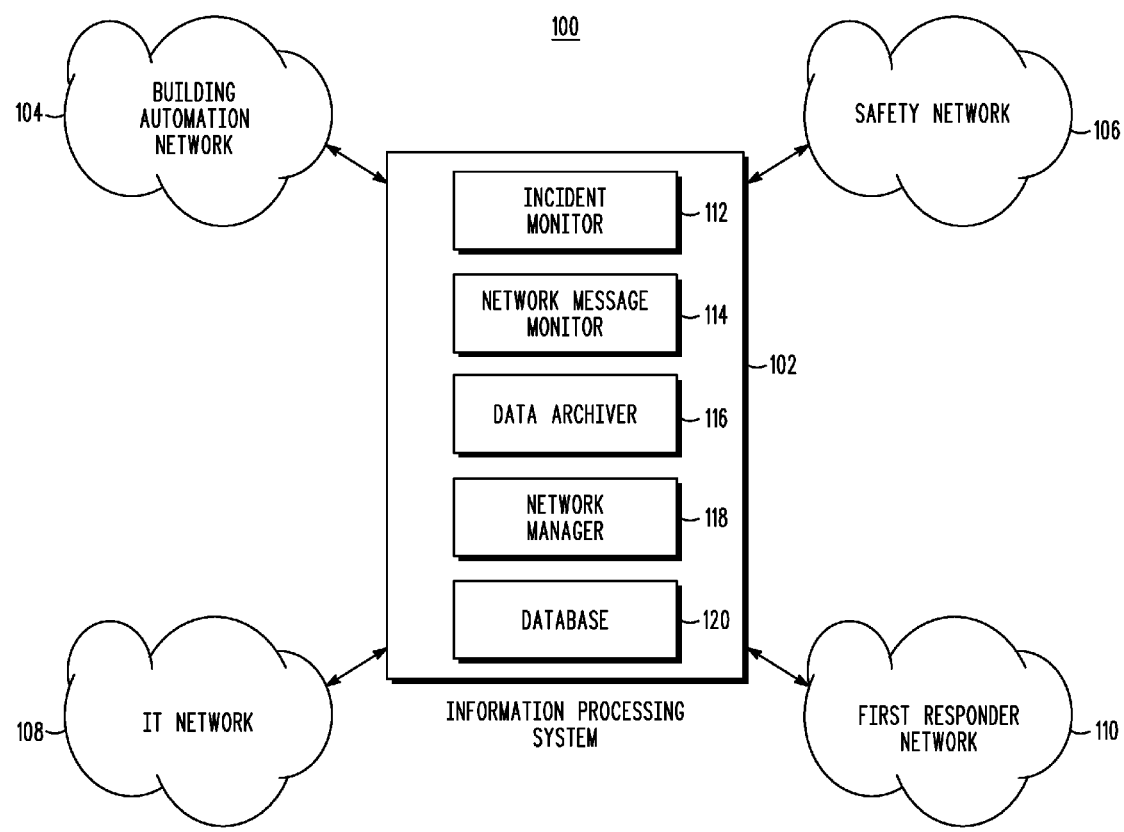
FIG. 1 is block diagram illustrating an exemplary system according to an embodiment of the present invention.

According to an embodiment of the present invention as shown in FIG. 1 an exemplary system 100 is illustrated. FIG. 1 shows a plurality of networks communicatively coupled to one or more information processing systems 102. For example, FIG. 1 shows a BAN network 104, a safety network 106, an IT network 108, and a first responder network 110. It should be noted that one or more networks can be added or removed to/from the system 100. In one embodiment, the system 100 resides within an office building, warehouse, or the like. The information processing system 102, in one embodiment, includes an incident monitor 112, a network message monitor 114, a data archiver 116, a network manager 118, and a database 120. Each of these components are discussed in greater detail below.

The BAN 104, as discussed above, manages and automates various systems of a building such as mechanical systems, electrical systems, and the like. The safety network 106, as discussed above, manages the safety systems such as fire sprinklers, smoke detectors, emergency ventilation systems, alarm systems, and the like within a building. The IT network 108, as discussed above, provides typical computer network functionalities, telephony services, video services, and the like.

The first responder network 110 is a network that provides information such as incident location, information from the safety network 106, and the like. The first responder network 110 may allow first responder personnel to interact with the other networks in the building and perform required functions. It should be noted that each of these networks 104, 106, 108, 110 comprise additional components not shown such as information processing systems, network equipment, and the like. It should also be noted that one or more of these networks 104, 106, 108, 110 can include one or more of the remaining networks. For example, the BAN 104 can include the safety network 106.

The information processing system 102 manages and monitors each of these networks 104, 106, 108, 110. One of the functions of the information processing system 102 is to provide the necessary bridge functions to facilitate information sharing between the networks 104, 106, 108, 110, and public safety equipment during times of emergency. The term bridge functions as used herein in one embodiment means the data control at the data layer of the OSI model including any necessary physical and logical connectivity and security between one or more networks 104, 106, 108, 110. Unlike simple routing, the term bridge function as used herein manages the data control and bandwidth allocation between networks by processing of each frame of data as it receives it. More specifically, the information processing system 102 coordinates bandwidth allocation amongst the various networks 104, 106, 108, 110 according to a current status of the building (e.g., emergency/non-emergency). The information processing system 102 can also store selected network messages and/or /data locally and off-site thereby ensuring that valuable data is not compromised during an emergency, such as a fire. Storing network traffic locally also ensures that first responder personnel can retrieve stored data if a connection to the off-site location is unavailable or not responsive enough. Network messages/data can include data from sensors such as environmental information (e.g., temperature, $CO_2$ measurements, smoke detection, and the like); data from IT networks; data from the BAN; and the like).

The information processing system 102 can be physically configured to withstand hostile environments such as fires, floods, and the like. Each of the networks 104, 106, 108, 110 and the information processing system 102 can be communicatively coupled to each other by one or more network protocols. For example, wired and/or wireless protocols may be used to communicatively couple each of the networks and the information processing system 102.

Building Network Management During Emergency/Non-Emergency Situations

During times of non-emergency, the information processing system 102 monitors messages via the safety message monitor 114 that are transmitted over the safety and BAN networks 106, 104. These messages can be time stamped and stored locally via the data archiver 116 in the database 120. The data archiver 116 can also store the network messages at a remote database. Examples of such messages are readings from the building safety sensors and any commands issued to safety equipment such as enunciators. The information processing system 102, in one embodiment, periodically queries devices on the network for status information. Devices can include smoke detectors, air sensors, sprinklers, door automation devices, motion sensors, thermostats, humidistats, and the like. Each of the devices communicatively coupled to the networks 104, 106, 108, 100 can be associated with a network address.

In one embodiment, any message that is passed between the BAN 104 and the safety network 106 is routed through the information processing system 102 or a copy of the message is sent to the information processing system 102. The incident monitor 112 within the information processing system 102 monitors one or more of the networks, such as the safety network 106, to determine if an incident is occurring. An incident can include a fire, volatile gas contamination, flood, security breach, earthquake, violent acts, and the like. In one embodiment, the safety network 106 notifies the information processing system 102 of an emergency situation. The safety network 106 can detect an emergency situation via one of its sensors or by an individual manually notifying the safety network 106. For example, an individual can pull a fire alarm, push a panic button, or the like.

During an emergency situation the information processing system 102 continues to store and begins to forward safety network messages. For example, safety network 106 messages can be forwarded to first responder equipment through the first responder network such as hand-held devices, personal terminals, terminals at dispatch centers, and the like. This allows the first responder personnel to be aware of safety information being received at the safety network 106. For example, temperature data can be forwarded to first responder personnel through the first responder network 100 so that a fire can be located; information regarding safety sensors that have been activated can be sent to first responder personnel; and the like.

Also during emergency situations, the information processing system 102 acts as a gateway between the various networks 104, 106, 108, 110. For example, the network manager 118 within the information processing system 102 establishes secure connections to each network 104, 106, 108, 110 as required by the security mechanism of each network. When an emergency situation is detected, the information processing system 102 can automatically connect to the first responder network 110. Alternatively, the information processing system 102 can wait until first responder personnel initiate a connection. Once a connection with the first responder network 110 is established, the information processing system 102 sends its log of safety network messages and all messages recorded during the emergency to the first responder network 110. This allows for off-site archiving, thereby providing further redundant storage of the data. The data can be archived on a remote information processing system, first responder devices such as a personal digital assistant (PDA), or the like.

The network manager 118 also manages bandwidth allocation between the various networks 104, 106, 108, 110 during emergency situations. For example, depending on the characteristics of the emergency, the first responder network 110 may require the most bandwidth. Therefore, portions of the IT network that provide less important services can be allocated less bandwidth. Also, the network manager 118 manages the networks 104, 106, 108, 110 to ensure interference between wireless networks does not occur during an emergency. For example, two or more of the networks 104, 106, 108, 110 can be at least partially wireless. If these networks operate in the same frequency band such as 2.4 GHz and use standard protocols, such as IEEE 802.11 or IEEE 802.15.4, the network manager 118 coordinates the bandwidth allocation between the two networks. In other words, the network manager 118 can notify one of the networks to stop transmitting so that the other network does not experience interference. In other words, the network manager 118 can preempt one or more networks from transmitting for a given period of time. Also, the network manager 118 can manage various portions of a single network that can potentially interfere with one another.

Figure 2:
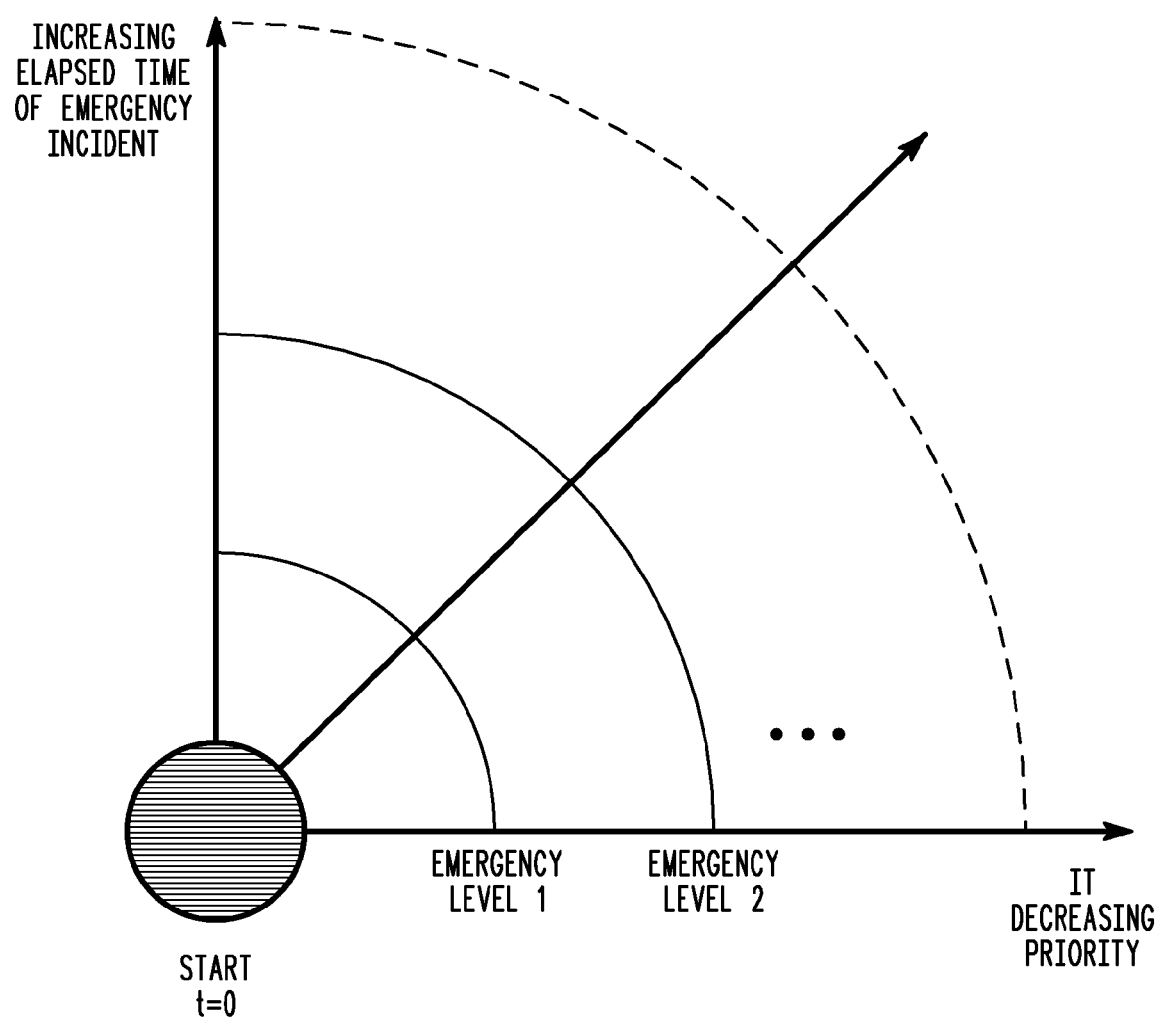
FIG. 2 is graphical representation that illustrates network resource prioritization according to an embodiment of the present invention.
Figure 3:
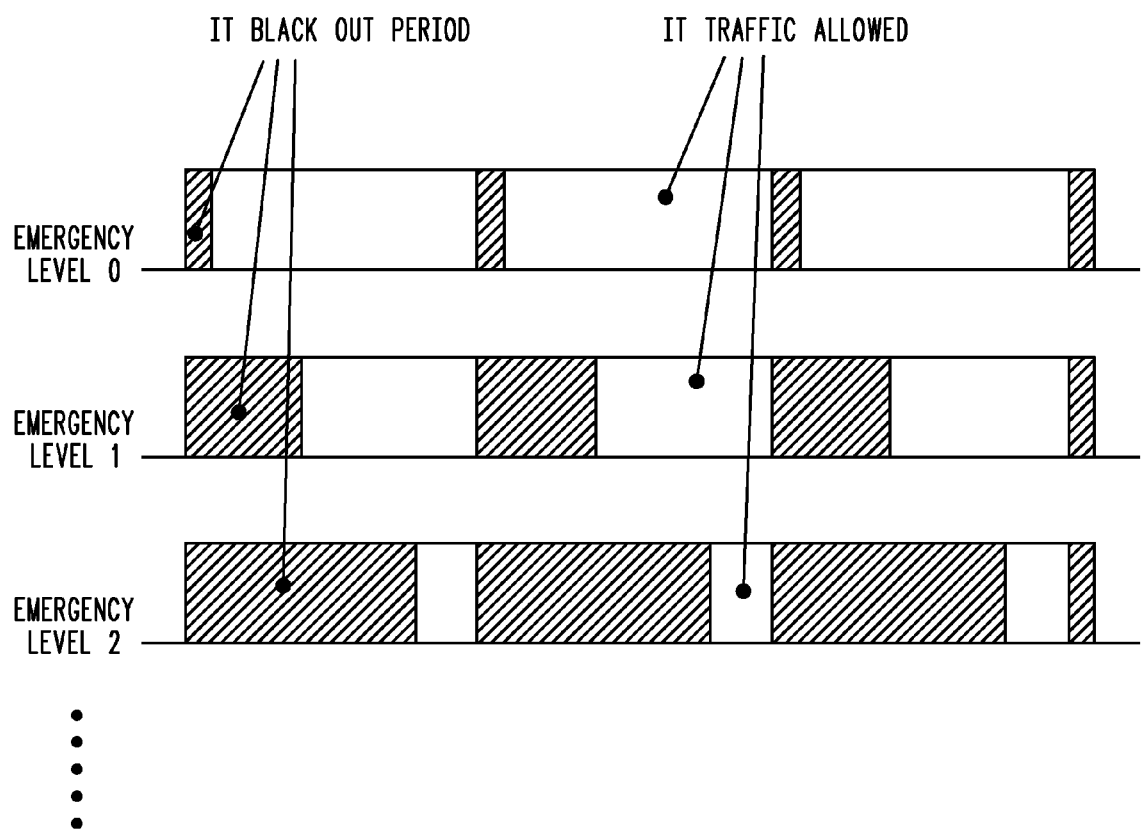
FIG. 3 is a timing diagram illustrating network resource prioritization according to an embodiment of the present invention.

The networks 104, 106, 108, 110 can be assigned different priorities based on the type of emergency, level of emergency as discussed with respect to FIG. 2 and FIG. 3, and the like. It is important to note that the different priorities of an amount of network bandwidth allocated to network traffic during a particular period of time in one embodiment are shared across at least two of the networks 104, 106, 108, and 110.

One type of network may have more importance than another type of network throughout various stages of an emergency. For example, VoIP functions may be important during initial stages of an emergency to enable victims to communicate over the voice network. Therefore, this portion of the IT network 108, in one example, is not de-allocated bandwidth. Stated differently, networks can be assigned different priorities based on the network type such as IT, safety, BAN, first responder, and the like. Emergency levels can be a direct function of the number of fire companies at the emergency location; a direct function of the number of sensors in an "alarm" state; a direct function of the proximity of the fire to hazmat areas or other critical areas; and the like. Emergency levels can indicate the seriousness/extent of the incident as well as the needs for more communication bandwidth on the part of the first responders.

Non-emergency networks can be configured to operate at substantially normal levels at initial stages of an emergency and have decreased functionality as the stages progress. This ensures that the first responder network 110 has sufficient bandwidth and resources during emergencies. The network management functions can also be extended to the first responder network 110. For example, when a first responder device registers with an access point, the information processing system can notify the other devices registered with that access point to either retard resource usage, operate normally, or the like.

Additionally, the network manager 118 can detect that first responder personnel were originally tied into a wireline VoIP network and have now switched to WiFi communications. Other devices operating in the same frequency band can be prevented from transmitting so that the first responder equipment is not interfered with. If the network manager 118 detects that a first responder device has registered with a network, the first responder device can be given priority for bandwidth and resources over other network devices.

Therefore, the network manager 118 manages the various networks 104, 106, 108, 110 so that networks such as the IT network 108 is not fully incapacitated by traffic on the safety and/or first responder networks 106, 110. However, the network manager 118 also manages networks, such as the IT network 108, so that they do not incapacitate traffic on the First responder or safety networks 106, 110.

FIG. 2 and FIG. 3 show an example of traffic prioritization periods. It should be noted that FIG. 2 is only one example of how networks are managed by the information processing system 102. FIG. 2 shows that at time t≦0 (prior to the start of the incident) the emergency is at Emergency Level 0 and the IT network 108 is functioning normally and short blackout periods are scheduled so that nodes on the safety network are able to communicate and to avoid switching collisions. However, at the start of an incident at time t=0, the information processing system 102 assumes control of the IT network 108. In other words, as the time for the emergency progresses, more bandwidth is apportioned for the safety network nodes. Hence, at t=t+t1 (Emergency Level 1), t=t+t2 ... t=t+tn, more bandwidth is given to the safety network.

As can be seen, the present invention comprises an advantageous system that allows for critical information and resources to be available to first responder personnel during times of an emergency. The present invention provides an information processing system that performs necessary bridging functions between various networks and first responder equipment during emergency situations. The present invention also manages bandwidth allocation between the various networks according to a current status of the building. Network data can be stored locally and off-site, thereby ensuring that valuable data is not comprised during an emergency such as a fire.

Exemplary Information Processing System

Figure 4:
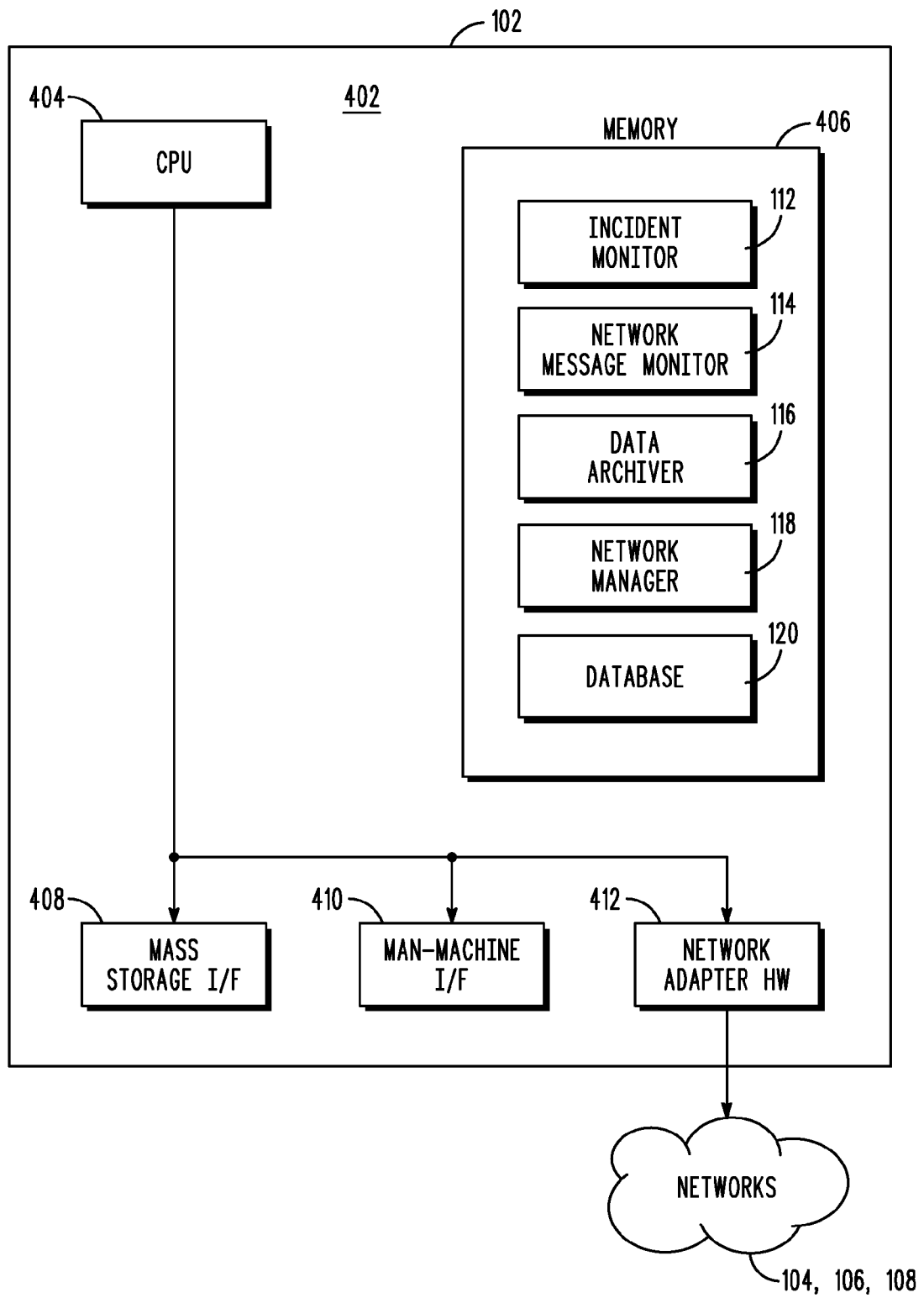
FIG. 4 is a block diagram illustrating a detailed view of a site controller according to an embodiment of the present invention.

FIG. 4 is a block diagram illustrating a more detailed view of the information processing system 102. The information processing system 102 is based upon a suitably configured processing system adapted to implement the embodiment of the present invention. For example, a personal computer, workstation, or the like, may be used. The information processing system 102 includes a computer 402. The computer 402 has a processor 404 that is connected to a main memory 406, a mass storage interface 408, a man-machine interface 410, and network adapter hardware 412. A system bus 414 interconnects these system components.

The main memory 406 includes the incident monitor 112, network message monitor 114, data archiver 116, network manager 118, and database 120. These components have been discussed above in greater detail. Although illustrated as concurrently resident in the main memory 406, it is clear that respective components of the main memory 406 are not required to be completely resident in the main memory 406 at all times or even at the same time. One or more of these components can be implemented as hardware.

The data storage device 416 can store data on a hard-drive or other media, such as a CD 418. Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. Man-machine interface 410 allows technicians, administrators, and the like, to directly connect to the information processing system 102.

An operating system (not shown) included in the main memory is a suitable multitasking operating system such as Linux, UNIX, Windows XP, and Windows Server 2003. Embodiments of the present invention are able to use any other suitable operating system. Some embodiments of the present invention utilize architectures, such as an object oriented framework mechanism, for executing instructions of the components of operating system (not shown) on any processor located within the information processing system 102.

The network adapter hardware 412 is used to provide an interface to the various networks 104, 106, 108, Internet, and the like. Embodiments of the present invention are able to be adapted to work with any data communications connections including present day analog and/or digital techniques or via a future networking mechanism.

Process of Initiating a Handover Scanning Procedure on a Wireless Device

Figure 5:
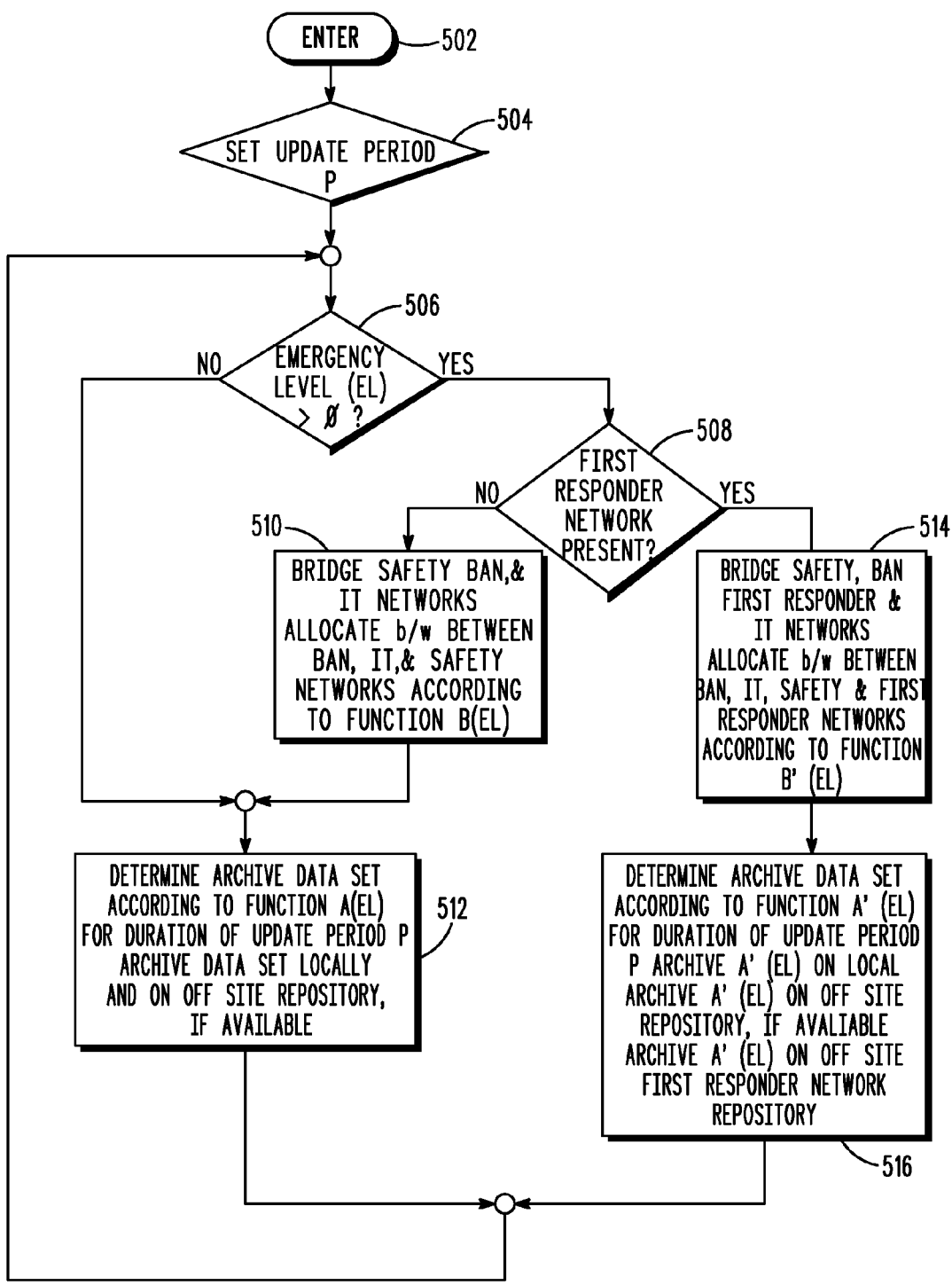
FIG. 5 is an operational flow diagram illustrating a process managing a plurality of network resources and prioritizing network resources during emergency situations according to an embodiment of the present invention.

FIG. 5 is an operational flow diagram illustrating a process managing a plurality of networks and allocating bandwidth/resources between the networks when an emergency situation is detected. The operational flow diagram of FIG. 5 begins at step 502 and flows directly to step 504. The information processing system 102, at step 504, sets an update period P for archiving network messages/data. The update period determines the time interval between changes in the bandwidth allocation and archiving functions. The information processing system 102, at step 506, determines if an emergency level associated with the building is greater than 0. In one example, level 0 indicates that an emergency is not occurring and as the severity of an emergency increases the level increases to a higher number. Essentially, the update period defines the points along the vertical axis in FIG. 2 at which the emergency level is evaluated and changes are made to the bandwidth allocated to the sensor node traffic. The update period is an integral multiple of the major intervals of FIG. 3, comprising a pair of contiguous "black out" and available sub-intervals. It is important to note that in another embodiment the allocating or sharing bandwidth/resource is not done by blacking out time intervals, a form of time division multiplexing, but through dynamic frequency multiplexing or spread spectrum techniques, such as orthogonal convolutional codes as in CDMA (code division multiple access) or a combination of both. In yet another embodiment, the ability to switch the types of traffic from physical network types i.e. wireline to wireless and vice-versa is used to reduce loading. If the result of this determination is negative, the information processing system 102, at step 512, determines network data that is to be archived, according to function A(EL). This determination is based on the emergency level, EL, which in this example, is 0. For example, general data can be archived during non-emergency situations and emergency specific information can be archived during emergency situations. The data can be archived locally at the information processing system 102 and/or remotely at an off-site location. The control flow returns to step 506. If the result of the original determination at step 506 is positive, the information processing system 102, at step 508, determines if a first responder network 110 is present. For example, the information processing system 102 can determine if first responder equipment has synched with one or more of the building networks.

If the result of this determination is negative, the information processing system 102, at step 510, bridges the various building networks such as the BAN 104, safety network 106, IT network 108, and the like. As described in FIGS. 2-3, the information processing system 102 also bridges the networks to allocate bandwidth between each of the networks based on emergency level or stage, according to function B(EL). The control flows to step 512. If the result of this determination is positive, the information processing system 102, at step 514, bridges the various building networks such as the BAN 104, safety network 106, IT network 108, and the like with the first responder network 110. The information processing system 102 allocates bandwidth between each of the networks and the first responder network 110 based on emergency level or stage, according to the function B'(EL). The information processing system 102, at step 516, determines network data that is to be archived based on the level or stage of the emergency. The data can be archived locally at the information processing system 102 and/or remotely at an off-site location. The data can also be archived on one or more first responder devices.

In one embodiment, the information processing system 102 can determine how to archive data based on the emergency level as follows. The rate at which data from the sensors is archived can be changed. For example, in the initial stages of an emergency, sensor data may only be archived at a given rate, which is slower than the rate at which the sensors generate data. When first responders arrive at the scene of the incident, the emergency level may increase, as discussed above. Therefore, the archiving can also increase accordingly. If the incident is a fire and the fire approaches a hazmat area, the rate of archiving for those sensors around the area may be increased. Also, any data from other hazmat sensors located throughout the building can be added to the archiving process.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for expanding first responder safety network coverage within a building, the method comprising:

monitoring, by an information processing system in the building, of at least one of sensor data transmitted over a building safety network and building mechanical system status data transmitted over a building automation network;

detecting, by the information processing system, an emergency signal indicating an existence of an emergency in the building and responsive to the detecting, the information processing system:

automatically bridging, by the information processing system, communication between at least one of (i) the building safety network and (ii) the building automation network and a first responder network, including beginning providing received sensor data and/or mechanical system status data to the first responder network for reception by mobile devices carried by first responder personnel responding to the emergency in the building; and managing bandwidth allocation between (i) the at least one of the building safety network and the building automation network and (ii) the first responder network in order to prioritize network traffic associated with the first responder network over network traffic not associated with the first responder network.

2. The method of claim 1, further comprising:
assigning different priorities to network traffic based on a network type associated with the network traffic.

3. The method of claim 2, wherein network traffic associated with the first responder network is given top priority over all other networks.

4. The method of claim 2, wherein the automatically bridging includes sharing a same priority across at least two building networks during a particular period of time.

5. The method of claim 2, wherein different priorities are assigned based on a level of the emergency selected from a plurality of different levels.

6. The method of claim 1, wherein the automatically bridging further comprises automatically bridging an information technology network with the first responder network.

7. The method of claim 6, further comprising:
responsive to the detecting, beginning providing information received from the information technology network to the first responder network.

8. The method of claim 1,
wherein beginning providing received sensor data and/or mechanical system status data comprises beginning providing environmental sensor data information received from the building safety network to the first responder network.

9. The method of claim 8, wherein the environmental sensor data information comprises at least one of:
temperature information of an area within the building; and
air quality information of an area within the building.

10. The method of claim 1, further comprising, responsive to the detecting:
beginning archiving, at least a subset of the at least one of received sensor data and/or mechanical system status via a local database and a remote database outside of the building.

11. The method of claim 1, further comprising:
determining that at least one building network and the first responder network communicate using wireless technology over substantially identical or overlapping frequency bands; and
preempting the at least one building network from transmitting wireless communications for a given period of time, wherein a degree of preemption varies over time or with a level of the emergency.

12. An information processing system for bridging building networks within a building with first responder safety networks, the information processing system comprising:
a memory;
a processor communicatively coupled to the memory;
a network message monitor configured to monitor the building networks including monitoring at least one of sensor data transmitted over a building safety network and building mechanical system status data transmitted over a building automation network;
an incident monitor configured to detect an emergency signal from at least one of the building networks; and
a network manager, in the building environment, configured to, responsive to the incident monitor detecting the emergency signal:
automatically bridges communication between at least one of the (i) building safety network and (ii) the building automation network and a first responder network, including beginning providing received sensor data and/or mechanical system status data to the first responder network for reception by mobile devices carried by first responder personnel responding to the emergency in the building; and
manage bandwidth allocation between (i) the at least one of the building safety network and the building automation network and (ii) the first responder network in order to prioritize network traffic associated with the first responder network over network traffic not associated with the first responder network.

13. The information processing system of claim 12, wherein the network manager is further configured to:
share a same priority across at least two of the building networks during a particular period of time, wherein network traffic associated with the first responder network is given top priority greater than the same priority; and wherein the different priorities determine at least an amount of network bandwidth allocated to network traffic during a particular period of time.

14. The information processing system of claim 12, wherein the network manager is further configured to, responsive to the incident monitor detecting the emergency signal, automatically connect to the bridges first responder network.

15. The information processing system of claim 12, wherein the network manager is further configured to, responsive to the incident monitor detecting the emergency signal:
begin arching, at least a subset of the at least one of received sensor data and/or mechanical system status via a local database and a remote database outside of the building.

16. A network for providing first responder safety within a building, the network comprising:
a plurality of building networks including safety network over which sensor data is transmitted; and a building automation network over which mechanical system status data is transmitted;
a first responder network over which information is provided to mobile devices carried by first responder personnel; and
at least one information processing system communicatively coupled to the building safety network and the building automation network, the information processing system comprising:
a memory;
a processor communicatively coupled to the memory;
an incident monitor configured to detect an emergency signal from one of the building networks; and
a network manager, disposed in the building, and configured to monitor activity on the building safety network and the building automation network, and wherein the network manager is configured to, in response to the incident monitor detecting the emergency signal:
automatically bridge communication between at least one of (i) the building safety network and (ii) the building automation network and a first responder network, including beginning providing received sensor data and/or mechanical system status data to the first responder network for reception by mobile devices carried by first responder personnel responding to the emergency in the building; and manage bandwidth allocation between (i) the at least one of the building safety network and the building automation network and (ii) the first responder network in order to prioritize network traffic associated with the first responder network over network traffic not associated with the first responder network.

17. The network of claim 16, wherein the network manager is further configured to:

assign different priorities to network traffic based on a network type associated with the network traffic, wherein network traffic associated with the first responder network is given top priority; and wherein the different priorities determine at least an amount of network bandwidth allocated to network traffic during a particular period of time.

18. The network of claim 16, wherein the plurality of building networks further include a building information technology network, the network manager being further configured to, in response to the incident monitor detecting the emergency signal, automatically bridge the building information technology network with the first responder network.

19. The network of claim 16, wherein the network manager is further configured to:

begin archiving at least a subset of the sensor data and/or mechanical system status data via a local database and a remote database outside of the building.

20. The method of claim 1, further comprising the step of, responsive to the detecting, the information processing system automatically connecting to the first responder network.

21. The information processing system of claim 12, wherein the network manager is further configured to, responsive to the incident monitor detecting the emergency signal, determine that at least one building network and the first responder network communicate using wireless technology over substantially identical or overlapping frequency bands, and to responsively preempt the at least one building network from transmitting wireless communications for a given period of time, wherein a degree of preemption varies over time or with a level of the emergency.

* * * * *

UNITED STATES PATENT AND TRADEMARK OFFICE
CERTIFICATE OF CORRECTION

Page 1 of 1

PATENT NO. : 8,116,327 B2
APPLICATION NO. : 11/830506
DATED : February 14, 2012
INVENTOR(S) : Schuette et al.

It is certified that error appears in the above-identified patent and that said Letters Patent is hereby corrected as shown below:

In Fig. 5, Sheet 5 of 5, for Tag "516, in Line 6" delete "AVALIABLE" and insert -- AVAILABLE --, therefor.

In Column 9, Line 43, in Claim 10, delete "archiving," and insert -- archiving --, therefor.

In Column 10, Line 30, in Claim 14, delete "the bridges first" and insert -- the first --, therefor.

Signed and Sealed this
Eighteenth Day of December, 2012

David J. Kappos
*Director of the United States Patent and Trademark Office*